US008857381B2

(12) United States Patent
Roberts, Jr.

(10) Patent No.: US 8,857,381 B2
(45) Date of Patent: Oct. 14, 2014

(54) PROCESS AND SYSTEM FOR CONTROLLING EFFECTIVE COMPRESSION RATIOS IN AN ENGINE CYLINDER

(75) Inventor: Charles Edward Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 1610 days.

(21) Appl. No.: 11/939,979

(22) Filed: Nov. 14, 2007

(65) Prior Publication Data

US 2009/0125209 A1    May 14, 2009

(51) Int. Cl.
| F02B 75/12 | (2006.01) |
| F02D 15/00 | (2006.01) |
| F02D 19/08 | (2006.01) |
| F02D 13/02 | (2006.01) |
| F02D 19/06 | (2006.01) |
| F02D 41/00 | (2006.01) |

(52) U.S. Cl.
CPC .... F02D 41/0025 (2013.01); *F02D 2200/0611* (2013.01); *F02D 19/0665* (2013.01); *F02D 2041/001* (2013.01); F02D 15/00 (2013.01); *Y02T 10/18* (2013.01); F02D 19/0628 (2013.01); *Y02T 10/36* (2013.01); F02D 19/087 (2013.01); F02D 13/0203 (2013.01); F02D 19/084 (2013.01)
USPC ............ 123/1 A; 123/525; 123/202; 123/321; 123/575; 701/103; 701/105; 73/61.48

(58) Field of Classification Search
USPC ......... 123/478, 1 A, 492, 575, 295, 304, 431, 123/202, 321; 370/310, 328, 241, 338; 367/198; 340/5.64, 5.72, 825.69, 340/539.12; 701/2, 33, 103–104; 455/67.11; 60/602
See application file for complete search history.

(56) References Cited

U.S. PATENT DOCUMENTS

| 3,949,595 | A |   | 4/1976 | Jones et al. |
| 4,306,526 | A | * | 12/1981 | Schaub et al. ................ 123/257 |
| 4,469,055 | A | * | 9/1984 | Caswell ...................... 123/78 B |
| 4,884,530 | A | * | 12/1989 | Boekhaus et al. ............ 123/1 A |
| 5,119,671 | A |   | 6/1992 | Kopera |
| 5,131,228 | A | * | 7/1992 | Mochizuki et al. ............ 60/602 |
| 5,229,946 | A | * | 7/1993 | Ghaem ........................ 701/106 |
| 5,231,358 | A |   | 7/1993 | Kapsokavathis et al. |
| 5,325,836 | A | * | 7/1994 | Orzel et al. ................... 123/478 |
| 5,941,217 | A |   | 8/1999 | Cheng et al. |

(Continued)

FOREIGN PATENT DOCUMENTS

JP        2001271682 A  * 10/2001    .............. F02D 41/04

OTHER PUBLICATIONS

US 6,925,972, 8/2005, Mogi (withdrawn).

(Continued)

*Primary Examiner* — Lindsay Low
*Assistant Examiner* — Kevin Lathers
(74) *Attorney, Agent, or Firm* — Grossman, Tucker et al (57) ABSTRACT

The present disclosure is directed at the control of an effective compression ratio setting in an engine which may use a variety of fuels or fuel blends. The effective compression ratio may be selected based upon information from a fuel sensor and stored information regarding the detected fuel composition. The effective compression ratio may be adjusted for a selected cylinder by intake or exhaust valve timing.

17 Claims, 3 Drawing Sheets

(56) References Cited

U.S. PATENT DOCUMENTS

| | | | |
|---|---|---|---|
| 6,308,124 B1* | 10/2001 | Kresse et al. | 701/53 |
| 6,343,571 B1 | 2/2002 | Rockwell et al. | |
| 6,389,874 B1 | 5/2002 | Huff et al. | |
| 6,609,413 B1 | 8/2003 | De Craecker | |
| 6,640,773 B2 | 11/2003 | Ancimer et al. | |
| 6,691,655 B2* | 2/2004 | Aoyama et al. | 123/90.16 |
| 6,840,235 B2* | 1/2005 | Koseki et al. | 123/568.14 |
| 6,947,830 B1 | 9/2005 | Froloff et al. | |
| 7,080,613 B2 | 7/2006 | Kuo et al. | |
| 7,159,623 B1 | 1/2007 | Carr et al. | |
| 7,406,871 B2* | 8/2008 | Sugiura | 73/592 |
| 2005/0268886 A1* | 12/2005 | Etou et al. | 123/406.29 |
| 2007/0150164 A1* | 6/2007 | Froloff et al. | 701/103 |
| 2008/0257309 A1* | 10/2008 | Alger et al. | 123/406.48 |

OTHER PUBLICATIONS

"Flex Fuel with MegaSquirt," downloadable at www.megasquirt.info; last updated Oct. 12, 2006; 6 pages.

"Carmakers References for VCR Fuel Consumption Reduction," Available at http://www.mce-5.com/vcr_strategy/experiments_results_prosp.htm; retrieved on Apr. 9, 2008; 4 pages.

"ISSYS Launches Embedded Fuel-cell Sensor," available at http://www.smalltimes.com/articles/article_display.cfm?ARTICLE_ID=283491&p=109; retrieved on Apr. 9, 2008; 1 page.

"Micro Density Meters, Announcing the latest ISSYS density meter—the model 106 in-line density meter!" available at http://www.mems-issys.com/html/density.html; retrieved on Apr. 9, 2008; 1 page.

Lichty, et al., "Gasoline-Alcohol Blends in Internal Combustion Engines," Industrial and Engineering Chemistry, vol. 30, No. 2; p. 222.

Tat, et al., "Biodiesel Blend Detection Using a Fuel Composition Sensor," Paper No. 01-6052 prepare for 2001 ASEA Annual International Meeting, Jul. 30-Aug. 1, 2001; 14 pages.

"About Wilks Enterprise, Inc.," available at http://www.globalspec.com/Supplier/Profile/WilksEnterprise/; retrieved on Apr. 9, 2008; 2 pages.

Wilkes Enterprises, Inc. home page; available at http://www.wilksir.com/; viewed on Apr. 9, 2008; 1 page.

"Biofuke Measurements," available at http://www.globalspec.com/FeaturedProducts/Detail/WillsEnterprise/Biofuel_Measurements/42604/; retrieved Apr. 10, 2008; 1 page.

Edgar, "Changing the Squeeze, The Technologies and Control of Variable Compression Ratio Engines," available at hhtp://autospeed.com/cms/A_110204/article.html; retrieved on Apr. 10, 2008; 4 pages.

* cited by examiner

PROCESS AND SYSTEM FOR CONTROLLING EFFECTIVE COMPRESSION RATIOS IN AN ENGINE CYLINDER

FIELD

The present disclosure relates to control of an effective compression ratio setting in an engine cylinder which may utilize a variety of fuels or fuel blends. The effective cylinder compression ratio may be selected based upon information from a fuel sensor and stored information regarding a detected fuel composition and the effective compression ratio may be adjusted for a selected cylinder by intake and/or exhaust valve timing.

BACKGROUND

It may be recognized that an engine operating on a single type of fuel may be tuned to optimize the trade-off in performance, for instance, horsepower, fuel economy, and/or emissions for the target fuel. However, for engines that operate on fuels that may vary in composition, or for engines that operate on fuels that are blended from separate components, the performance of the engine may typically be limited by that obtainable for only a single fuel or blend. For example, an engine optimized for gasoline-fueled operation may be calibrated by the manufacturer to deliver an optimized combination of fuel economy, performance and emissions. That engine may not exhibit an optimized combination of fuel economy, performance and emissions when operated on a blend of, for instance, ethanol and gasoline. This may be due to the fact that gasoline and an ethanol-gasoline blend are relatively different in such properties as volatility, fuel heating value, octane number and flame speed.

SUMMARY

In a first exemplary embodiment the present disclosure relates to a method for adjusting the quantity of mass in a selected cylinder undergoing compression. The method includes providing a database of volume compression ratios ($CR_v$) for a plurality of fuels and identifying a fuel and identifying a volume compression ratio ($CR_v$) for the fuel from the database. This may then be followed by determining a time period for opening and closing of one of an intake valve or exhaust valve sufficient to provide an effective compression ratio (ECR) for the fuel in the selected cylinder wherein the ECR is based upon the volume compression ratio for the fuel. This may then be followed by adjusting the time period to provide the effective compression ratio.

In another exemplary embodiment, the present disclosure again relates to a method for adjusting the effective compression ratio for different fuels or blends of fuels in a selected engine cylinder. The method includes providing a database of volume compression ratio data for fuels comprising hydrocarbons of the formula $C_nH_m$ and oxygenated fuels having the formula $C_nH_mO_i$. This may then be followed by identifying a fuel containing about 5-95% by weight of $C_nH_mO_i$ mixed with $C_nH_m$ and identifying a volume compression ratio for such fuel mixture from the database. One may then determine a time period for opening and closing of one of an intake valve or exhaust valve sufficient to provide an effective compression ratio for the fuel in the selected cylinder wherein the effective compression ratio is based upon the volume compression ratio for the fuel. This may then be followed by adjusting the time period to provide the effective compression ratio, wherein the volume compression ratio of the fuel mixture is between about 5:1 to about 20:1.

In yet another exemplary embodiment, the present disclosure relates to a system for adjusting the effective compression ratio for different fuels or blends of fuels. The system may include a database of volume compression ratios ($CR_v$) for a plurality of fuels including time periods for opening and closing one of an intake valve or exhaust valve to provide an effective compression ratio (ECR) in a selected cylinder. A fuel composition sensor is then provided that is configured to sense the presence of an oxygenated fuel having the formula $C_nH_mO_i$ and a hydrocarbon fuel having the formula $C_nH_m$. The system also includes an engine control unit which, upon receiving information from the sensor, is configured to adjust the time period for opening and closing one of an intake valve or exhaust valve to adjust the effective compression ratio.

In a still further exemplary embodiment, the present disclosure relates to an article comprising a storage medium having stored thereon instruction that when executed by a machine result in the following operations: identifying a fuel and identifying a volume compression ratio for the fuel from a database of volume compression ratios for a variety of fuels; determining a time period for opening and closing of one of an intake value or exhaust valve sufficient to provide an effective compression ratio (ECR) for the identified fuel in a selected cylinder wherein the ECR is based upon the volume compression ratio for said fuel; and adjusting the time period to provide the effective compression ratio.

BRIEF DESCRIPTION OF THE DRAWINGS

The abovementioned and other features and advantages of the present invention, and the manner of attaining them, will become more apparent and the invention will be better understood by reference to the following description in conjunction with the accompanying drawings wherein.

DETAILED DESCRIPTION

The present disclosure relates to a method and system for improving the performance of an engine that is capable of operating on multiple fuels or blends of fuels. The engine may include an internal combustion engine, such as a spark ignition type engine, where the types of fuels introduced may vary over a typical engine lifetime.

By reference to fuel it may be understood herein that fuels may be composed of a variety of ingredients, each of which may have its own energy content which may be expressed in British thermal units per gallon (Btu/gal). The fuels may therefore be represented by a variety of formulas, including $C_nH_m$ and/or $C_nH_mO_i$, where n, m and i may all be integers. As may be appreciated, the incorporation of oxygen is reference to the feature that the fuels may contain oxygenates or oxygen bearing compounds.

The fuels may be specifically sourced from a hydrocarbon supply, which is reference to a compound containing carbon and hydrogen. For example, in the particular case of gasoline, a mixture may be present of aliphatic hydrocarbons, aromatic hydrocarbons (toluene, benzene) along with iso-octane to modify octane ratings. The hydrocarbons may contain saturated hydrocarbons having the formula $C_nH_{2n+2}$ and/or unsaturated hydrocarbons having the formula $C_nH_{2n}$ and/or cyclic alkanes and/or aromatic hydrocarbons.

An example of oxygen bearing compound type fuels includes organic alcohols, which may specifically include fuels containing methanol, ethanol, propanol and/or butanol, wherein such alcohols may also be of biological origin. Oxygenates may also include methyl-tertiary-butyl ether (MTBE), ethyl tertiary-butyl ether (ETBE) and/or tertiary-amyl methyl ether (TAME).

Mixture of alcohol and gasoline contemplated herein may specifically include a mixture of about 10% (wt.) ethanol and 90% (wt.) gasoline, which may be designated as E10. Other blends of ethanol and gasoline therefore include E5 (5% wt. ethanol) and E7 (7% wt. ethanol). In addition, higher blends of ethanol and gasoline are available as grades E15 (15% wt. ethanol) and E20 (20% wt. ethanol). Much higher levels of ethanol are available in E85 (85% wt. ethanol) and E95 (95% wt. ethanol). However, it should be noted that a vehicle owner, through multiple refuelings of the fuel tank of a vehicle, may create a mixture with a relatively broad range of ethanol concentrations, e.g. an ethanol concentration that may be between 5% wt. ethanol to 95% wt. ethanol, including all values and increments therein.

Octane rating is commonly employed to measure the autoignition resistance of gasoline and other fuels (e.g. E10) utilized in spark-ignition internal combustion engines. Octane may be measured relative to a mixture of iso-octane (2,2,4-trimethylpentane) and n-heptane. Accordingly, the use of a fuel with a relatively higher octane rating may allow an engine to run at a relatively higher compression ratio, increasing the expected fuel economy of the engine.

The volume compression ratio ($CR_v$) for a selected cylinder may be understood herein as the volume swept by the piston in the cylinder (Vp), plus the combustion space volume (Vcs), divided by the combustion space volume, which may be expressed as follows:

$$CR_v = \frac{Vp + Vcs}{Vcs}$$

Typically, the nominal $CR_v$ of an engine may be fixed, and in the case of a gasoline engine, the nominal $CR_v$ may be typically about 10:1. Accordingly, the volume compression ratio for a given cylinder in a given engine remains constant or fixed, but the fuels that may be introduced may vary. This may then create a situation where the fuel may not experience its targeted volume compression ratio.

More specifically, for a given fuel having a particular octane rating, or as between a hydrocarbon fuel and a mixture of gasoline and an alcohol (e.g. E10), the optimum volume compression ratio for such fuel may vary. Accordingly, the disclosure herein recognizes that by varying the amount of mass (e.g. air and fuel) that is ultimately trapped in any selected cylinder at the time of intake valve closing, a given fuel may be configured, for a selected cylinder, to achieve a targeted volume compression ratio. Targeted volume compression ratios contemplated herein may therefore vary between about 5:1 to about 20:1, including all values and increments therein.

Expanding upon the above, it may be appreciated that by adjusting the amount of mass that is introduced into the cylinder by adjustment of valve timing (opening and closing of the valve), the pressure and temperature that such mass will experience at the time of ignition may be made to vary, for a given cylinder's fixed volume compression ratio. In that sense it may be appreciated herein that considering the pressure and temperature that is achieved at the time of ignition, and by varying the mass within the cylinder, one provides a useful and alternative method to achieve an effective compression ratio (ECR) for a wide variety of fuels. In addition, such method may avoid the introduction of a completely separate component, such as an external air-injection compressor. In that regard, the invention herein may be implemented in a variety of engines and a variety of selected cylinders and the effective compression ratio may be achieved via a procedure that consists of no more than valve timing regulation.

Accordingly, the method herein may utilize changes in the engine's valve intake valve timing to adjust the trapped-mass and the final pressure and temperature (i.e. thermodynamic conditions) that the trapped mass experiences at a given and fixed volume compression ratio ($CR_v$). In that regard, it may be appreciated that the present disclosure provides a methodology to alter the thermodynamic conditions experienced at the time of ignition, such that the fuel at issue may experience an effective compression ratio which therefore optimizes performance (complete combustion). It may now also be appreciated that for a given fuel having a targeted volume compression ratio, and for a given cylinder having a fixed volume compression ratio, the effective compression ratio (ECR) of the fuel may be configured based upon the targeted volume compression ratio by adjustment of valve timing. More generally, for a given fuel, the ECR may be configured herein to be equal to and/or within ±10% of a volume compression ratio ($CR_v$) that is identified for such fuel. For example, for a given fuel, the volume compression ratio may be identified as being 12:1. Accordingly, by adjustment of valve timing noted herein, an ECR may be realized for the fuel where the ECR may be equivalent to a volume compression ratio between 10.8:1 to 13.2:1.

Accordingly, the disclosure herein contemplates the use of mixtures of hydrocarbon and alcohol based fuels wherein the mixture may be understood as a mixture of hydrocarbons $C_nH_m$ and oxygenated fuels $C_nH_mO_i$ wherein the level of oxygenated fuel may vary between about 5-95% by weight where the volume compression ratio for such fuels is targeted to occur between about 10:1 to about 15.0:1 for a given alcohol based fuel composition. In addition, reference herein to, e.g., a fuel level of about 5% by weight may be understood as a fuel level that varies by ±1.0% by weight. Reference to, e.g., a compression ratio of about 10:1 may be understood as a compression ratio of 11:1 to 9:1. Accordingly, intake valve timing may now be adjusted so that the thermodynamic conditions (pressure and temperature of the fuel) at the time of ignition are varied and the fuel undergoes and experiences an effective compression ratio that is in fact commensurate with the desired volume compression ratio that the fuel may be targeted to achieve.

The present disclosure therefore contemplates that upon detection of, e.g., an alcohol based fuel, the ECR may be specifically adjusted through a change in intake and/or exhaust valve timing. For example, it may be appreciated that a given cylinder in a spark ignition engine will have an intake valve (for introduction of fuel/air) and exhaust valve (for removal of the products of combustion) each of which may be varied in the time that they may be opened and/or closed such that any ensuing trapped air/fuel mixture in the combustion chamber, targeted for compression and combustion, may be varied in an amount as desired. In such manner it may therefore be appreciated that the present disclosure contemplates that intake and exhaust valve timing, which may be understood as the time that such valves may be individually opened and/or closed in a given combustion cycle, may be independently regulated to allow for an adjustment in the effective cylinder compression ratio, as noted above.

With respect to the identification of fuel, the present disclosure contemplates the use of a fuel sensor, which sensor may detect one or more properties of a given fuel composition so that the compression ratio selected may proceed as indicated. For example, the fuel sensor may rely upon the dielectric properties of the fuel, and reference is made to U.S. Pat. No. 5,119,671, whose teachings are incorporated herein by reference. Another example of a sensor to detect fuel composition is similarly disclosed in U.S. Pat. No. 5,231,358, which points out that a fuel composition sensor may include optical, microwave and capacitive sensors. Accordingly, one may detect the percentage of alcohol in a gasoline/alcohol mixture and then utilize such information (as noted above) to adjust valve timing to achieve an effective compression ratio (ECR) for such fuel from a database of volume compression ratios ($CR_v$) for a variety of different fuel compositions.

For example, in the context of the present invention, the fuel sensor may detect that a given fuel composition has shifted from a standard gasoline (e.g. octane rating of about 85-90) to a gasoline/alcohol combination (e.g. E10). In that situation where a gas/alcohol combination is introduced to a fuel tank that contains a gasoline supply that does not contain alcohol, the detected level of alcohol may initially be at a relatively low concentration, e.g., at levels between about 1-5% (wt.). Accordingly, in the context of the present disclosure, the database may include desired volume compression ratios for gasoline/alcohol mixtures wherein alcohol level varies at increments of 1.0% (wt.). In such manner, and as explained more fully below, as the sensor determines that the alcohol level has increased or decreased about 1.0% by weight, the database may then identify a stored volume compression ratio for such fuel mixture (e.g. $CR_v$ data for fuel mixtures containing 5-95% wt. alcohol at 1% increments). The system may then adjust valve timing so that the effective compression ratio is set to achieve the volume compression ratio that may be identified. This may then provide that an optimum level of mechanical energy may be derived from the associated air-fuel mixture. Or, stated another way, by sensing the fuel mixture of levels of alcohol and implementing an effective compression ratio for such fuel mixture from stored information regarding a given fuel's desired volume compression ratio, the engine may be operated at a relatively more desirable effective compression ratio for each fuel or fuel blend and the system may continuously respond to changes in the fuel mixture (e.g. changes in alcohol levels of about 1.0%).

Figure 1:
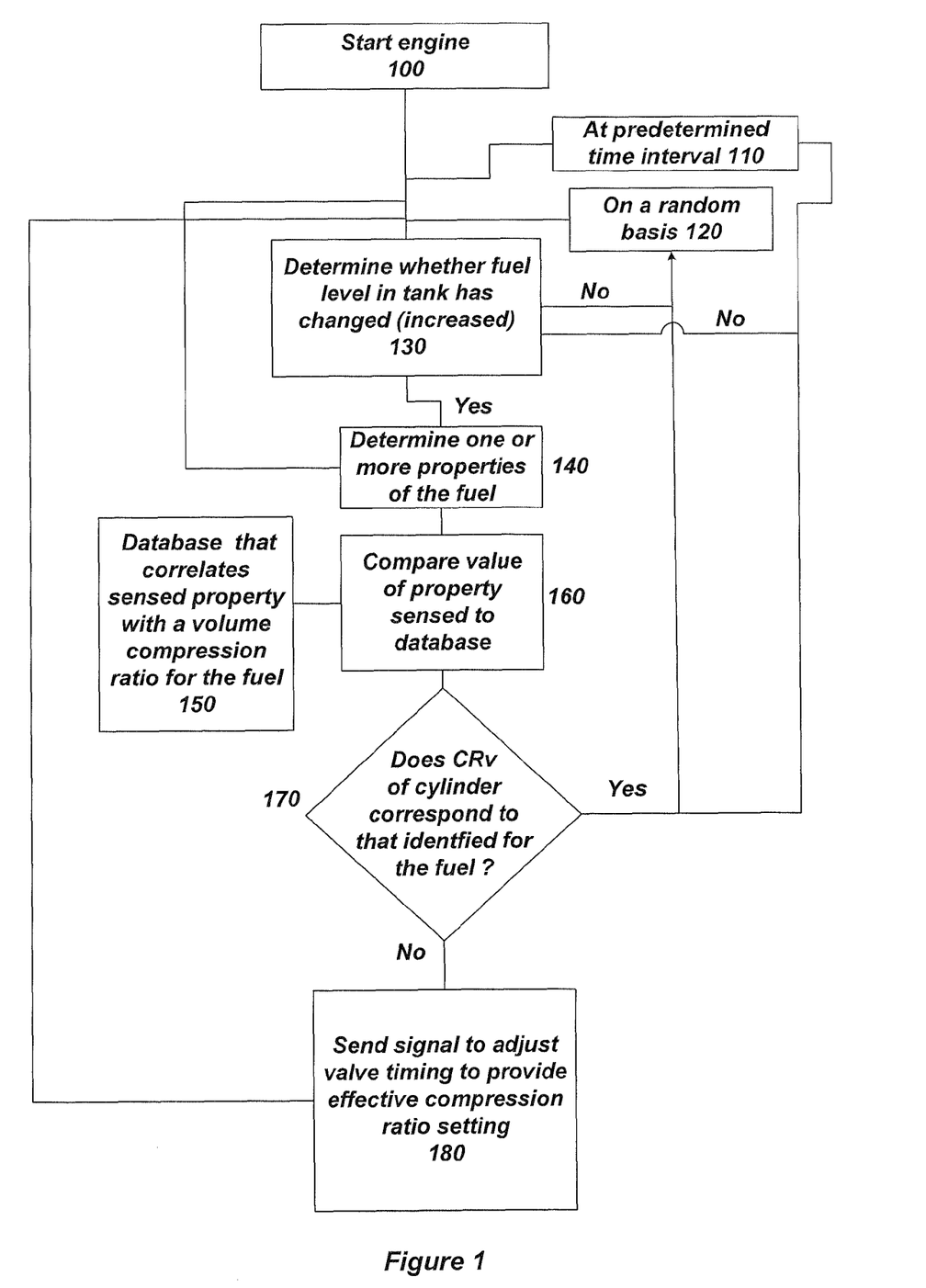
FIG. 1 illustrates in flow-chart form an example of the methodology for identifying a fuel and associated volume compression ratio and implementing an effective compression ratio in a spark-ignition engine via valve timing adjustment(s).

Attention is now directed to FIG. 1, which provides an exemplary flow diagram regarding a method or system to sense a given fuel composition and the procedure for implementing a corresponding adjustment to achieve an effective compression ratio based upon a consideration of stored information regarding volume compression ratio values for a variety of different fuels. At 100, upon start of the engine, the system may determine at 140 one or more properties of the fuel via the above referenced sensors. As noted, this may include a consideration of the dielectric properties of the fuel and a determination of the relative concentration of alcohol (e.g. ethanol) in an alcohol/hydrocarbon mixture. However, it is contemplated herein that the fuel property that may be evaluated may include any one or plurality of properties which distinguishes fuel composition. This may therefore include what may be termed a fuel physical property, including, but not limited to, density and/or specific gravity and/or viscosity. It may also include optical properties, such as light refraction and/or infrared absorption characteristics.

At 160, a comparison may be implemented as between the information provided by the sensor and the database 150 which correlates the detected property (e.g. alcohol concentration) with a desired volume compression ratio ($CR_v$) for such fuel. The system may then determine at 170 whether or not the volume compression ratio available in the cylinder corresponds to the volume compression ratio reported in the database. If "yes" the system may then, at some predetermined time interval of vehicle operation, as shown generally at 110, or on a random basis as shown at 120, recycle itself and again initiate the process decision points described herein.

If at 170 the system determines that the $CR_v$ of the cylinder is not what is indicated by the database for a given fuel, the system may then send a signal at 180 to, e.g., the engine control unit (ECU) to adjust valve timing to achieve an effective compression ratio based upon the volume compression ratio identified for the fuel and the particular engine cylinder under consideration. The ECU may therefore include a programmable computer control system for electronically controlling engine components, such as the cylinder intake and exhaust valve states. As noted above, this may include setting the valve timing so that the effective compression ratio may be adjusted to provide an effective compression ratio based upon the stored volume compression ratio data for a variety of fuel compositions. Reference to an engine control unit herein may therefore be understood as the on-board computer processing unit which may be in communication with the engine and which may monitor and control one or more engine operating variables, such as valve timing, fuel volume, engine temperature, emission sensor, etc. Such ECU may include an application specific integrated circuit (ASIC), an electronic circuit, a processor (shared, dedicated or grouped) and memory that may execute one or more software or firmware programs, a combinational logic circuit and/or other suitable components that provide the desired functionality.

As may now be appreciated, the system herein also may include the ability, during engine operation, and as shown at 130, to determine whether the fuel level in the tank has changed (e.g. increased in an amount of ±5.0% by volume). An increase in fuel level may of course be associated with the introduction of a new fuel to the engine, and as such, the system herein may respond and sense the characteristics of such new fuel in order to select and implement an effective compression ratio as noted above. In addition, it may be appreciated that the system herein may determine whether or not, for a given fuel composition, there may be a need to adjust the effective compression ratio based upon the level of load being placed on the engine (full throttle, half throttle, etc.). Again, the database 150 may therefore include stored information regarding the $CR_v$ versus load requirements for a given fuel and upload such information to the ECU during vehicle operation.

As noted, the database 150 may include volume compression ratios for a given fuel combination which, as noted above, may optimize engine performance. It is also contemplated herein that the database 150 may also include, for a given fuel, one or a plurality of different volume compression ratios for such fuel, wherein one volume compression ratio may provide optimum energy output, another volume compression ratio may optimize fuel consumption, and another volume compression ratio may optimize emissions output (e.g. reduce combustion by-products such as nitrous oxides or NOx). It may therefore be appreciated that for a given database, the user may select and instruct the ECU to implement an effective compression ratio for the given fuel system that the user may desire for a given operation period of the engine.

As noted, the adjustment of compression ratio herein may be accomplished by a variable valve actuation or timing for the engine, and upon receiving a signal, adjusting the intake and/or exhaust valves to vary the amount of air/fuel that may be compressed in the cylinder by the piston. This adjustment of the compression ratio may also be done independently of other engine operating parameters (e.g., ignition timing). Accordingly, an engine may now be configured to utilize a fuel that may be more suitable for operation at a relatively high volume compression ratio (e.g. E10 as compared to gasoline). In addition, when E10 may no longer be present and the on-board sensor determines that only gasoline is the fuel being used, the engine may be adjusted by intake or exhaust valve timing to a relatively lower effective compression ratio.

Figure 2:
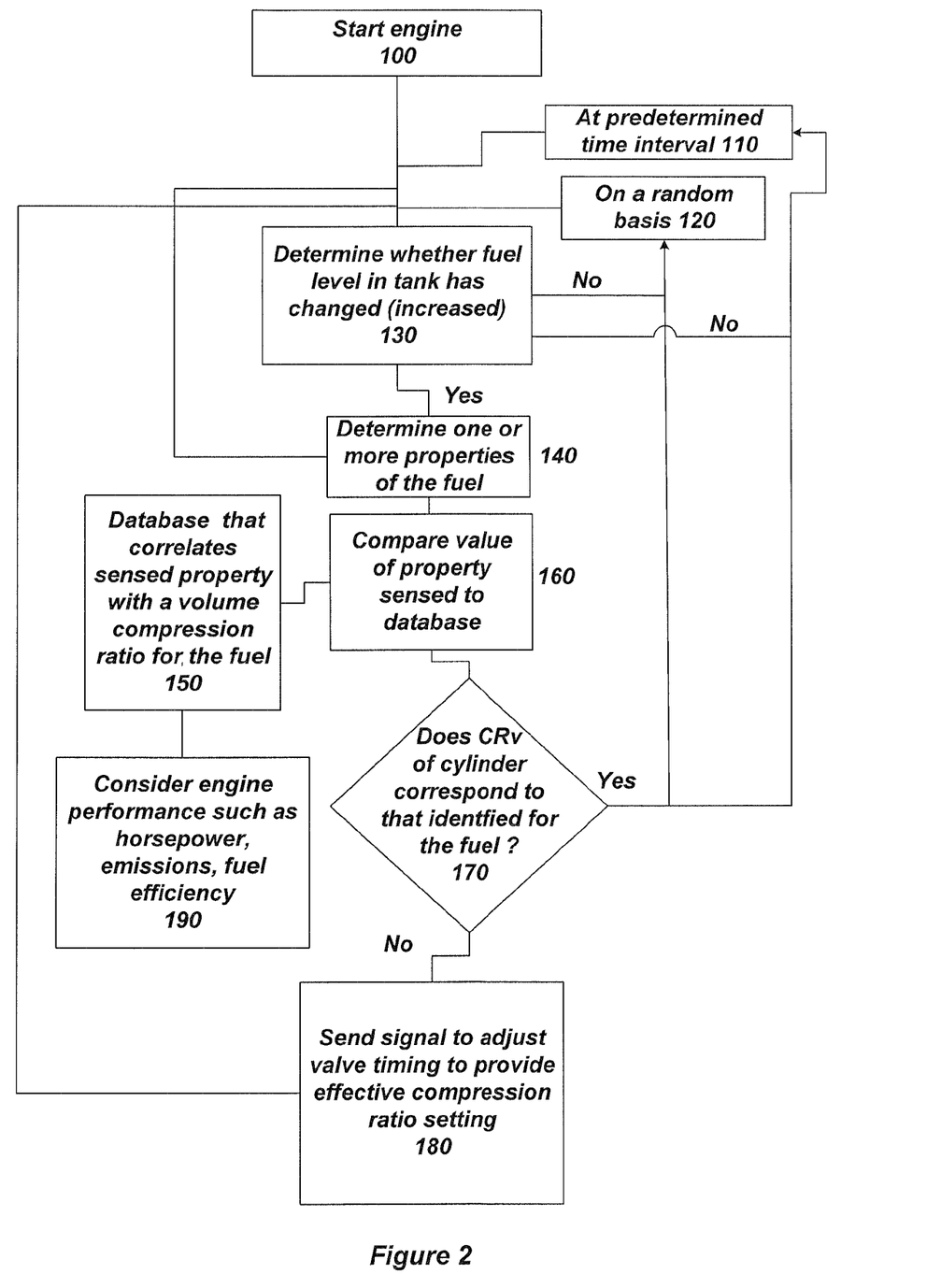
FIG. 2 illustrates in flow-chart form an example of the methodology for identifying a fuel and associated volume compression ratio and implementing en effective compression ratio in a spark-ignition engine via valve timing adjustment(s), including consideration of other engine operating/performance variables.

FIG. 2 provides another illustration of the present disclosure. Similar to the steps described above, the system may include additional sensors to monitor other engine operating/performance characteristics. For example, the ECU may receive data from sensors and determine operating conditions such as the current engine speed (rpms), intake manifold temperature, intake manifold pressure, intake valve timing, exhaust valve timing, mass of external exhaust gas recirculation (EGR), coolant temperature, vehicle speed, throttle position, ignition timing, intake air temperature, etc. Accordingly, as illustrated, once the database identifies a particular fuel based upon a sensed property, the system may also consider at 190 specific engine performance characteristics for such fuel such as maximizing horsepower, reducing relative emissions, increasing fuel efficiency (miles/gallon of fuel), etc. Depending upon a user input, the system may then implement an effective compression ratio that optimizes any one of these engine performance characteristics. Accordingly, such system may allow feedback from the additional engine performance sensors (other than fuel type sensors noted above) to adjust the engine to an effective compression ratio in a given cylinder based on the type of fuel being used as well as the type of performance that may be desired for such fuel.

Figure 3:
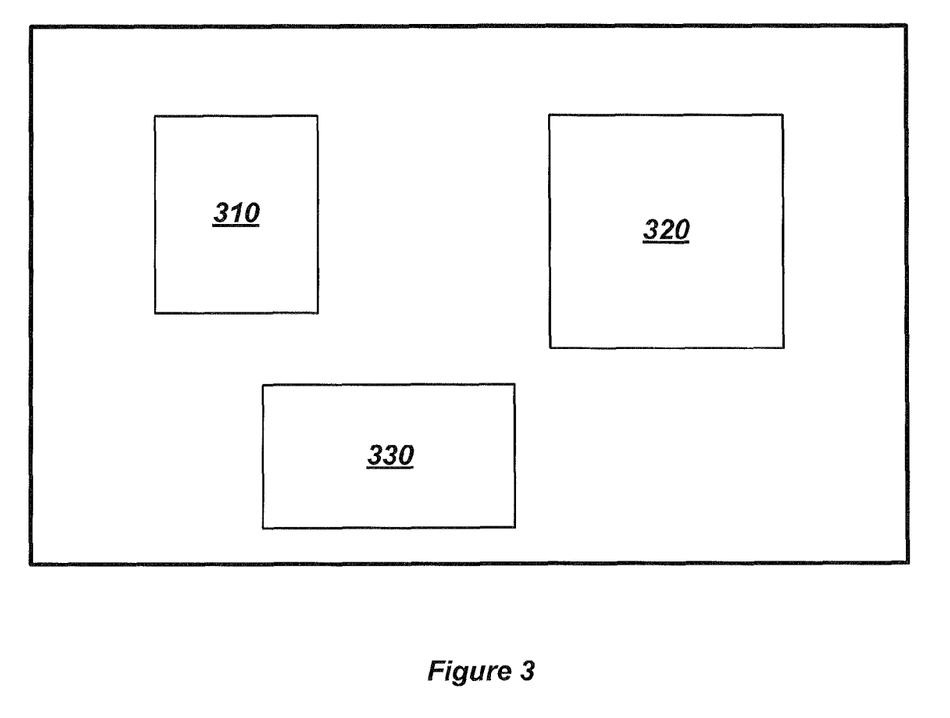
FIG. 3 illustrates a processor, machine readable media and a user interface that may be used herein to implement an effective compression ratio based upon volume compression ratio data.

It should also be appreciated that the functionality described herein for the embodiments of the present disclosure may be implemented by using hardware, software, or a combination of hardware and software, either within the engine control unit or outside the engine control unit, as desired. If implemented by software, a processor and a machine readable medium are required. The processor may be of any type of processor capable of providing the speed and functionality required by the embodiments of the disclosure. Machine-readable memory includes any media capable of storing instructions adapted to be executed by a processor. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in either a compressed and/or encrypted format. Accordingly, in the broad context of the present invention, and with attention to FIG. 3, the engine combustion controller may contain a processor (310) and machine readable media (320) and user interface (330).

Accordingly, it may be appreciated that the current disclosure is directed at an article comprising a storage medium having stored thereon instruction that when executed by a machine result in the following operations: (a) identifying a fuel and identifying a volume compression ratio for the fuel from a database of volume compression ratios for a variety of fuels; (b) determining a time period for opening and closing of one of an intake value or exhaust valve sufficient to provide an effective compression ratio (ECR) for the identified fuel in a selected cylinder wherein the ECR is based upon the volume compression ratio for the fuel; and (c) adjusting the time period to provide the effective compression ratio.

The foregoing description is provided to illustrate and explain the present invention. However, the description hereinabove should not be considered to limit the scope of the invention set forth in the claims appended hereto.

What is claimed is:

1. A method for adjusting the amount of mass in a selected cylinder undergoing compression comprising:
providing a database, wherein the database includes at least one physical or optical property for each of a plurality of fuels having different compositions, and targeted volume compression ratios for the plurality of fuels;
identifying a fuel from the plurality of fuels in the database with a fuel composition sensor which senses a presence of the fuel by sensing the presence of the at least one physical or optical property of the fuel;
identifying a targeted volume compression ratio for said fuel from said database from a plurality of targeted volume compression ratios for said fuel, said plurality of targeted volume compression ratios including at least a first targeted volume compression ratio to optimize energy output, a second targeted volume compression ratio to optimize fuel consumption, and a third targeted volume compression ratio to optimize emissions output;
determining a time period for opening and closing at least one of an intake valve and exhaust valve sufficient to provide an effective compression ratio for said fuel in said selected cylinder based upon the targeted volume compression ratio for said fuel;
opening and closing at least one of said intake valve and exhaust valve at said time period to provide said effective compression ratio;
wherein said effective compression ratio is within +/−10% of said targeted volume compression ratio for said fuel;
wherein said selected cylinder is a cylinder of an internal combustion engine which operates with variable valve timing; and
wherein said effective compression ratio is achieved without use of an external air-injection compressor.

2. The method of claim 1 wherein said plurality of fuels comprise hydrocarbons of the formula $C_nH_m$ and oxygenated fuels having the formula $C_nH_mO_i$.

3. The method of claim 1 including determining a time period for opening and closing both of said intake valve and exhaust valve sufficient to provide said effective compression ratio; and
opening and closing both of said intake valve and exhaust valve at said time period to provide said effective compression ratio.

4. The method of claim 1 wherein said database of targeted volume compression ratios for said plurality of fuels comprises targeted volume compression ratios between about 5:1 to about 20:1.

5. The method of claim 1 wherein said database of targeted volume compression ratios for a plurality of fuels includes fuel mixtures containing a range of 5-95% by weight of an oxygenated fuel having the formula $C_nH_mO_i$ in a hydrocarbon fuel having the formula $C_nH_m$, and wherein said targeted volume compression ratios for said fuel mixtures are at about 1.0% increments for said range.

6. The method of claim 1 including sensing a change in a composition of said fuel and adjusting said time period for opening and closing at least one of said intake valve and exhaust valve to adjust said effective compression ratio for said change in said composition of said fuel.

7. The method of claim 1 including evaluating a composition of said fuel at a predetermined time interval to sense a change in said composition of said fuel.

8. The method of claim 1 including:
sensing engine operating conditions comprising one or more of an engine speed (rpms), intake manifold temperature, intake manifold pressure, intake valve timing, exhaust valve timing, mass of external exhaust gas recirculation, coolant temperature, vehicle speed, throttle position, ignition timing, intake air temperature; and
adjusting said targeted volume compression ratio based upon one or more of said engine operating conditions.

9. A method for adjusting the effective compression ratio for different fuels or blends of fuels in a selected engine cylinder comprising:
providing a database, wherein the database includes at least one physical or optical property for each of a plurality of fuel mixtures, and targeted volume compression ratio data for the fuel mixtures, wherein the fuel mixtures comprise hydrocarbons of the formula $C_nH_m$ and oxygenated fuels having the formula $C_nH_mO_i$;
identifying a fuel mixture from the plurality of fuel mixtures in the database with a fuel composition sensor which senses a presence of the fuel mixture by sensing the presence of the at least one physical or optical property of the fuel mixture, and wherein the fuel mixture contains about 5-95% by weight of $C_nH_mO_i$ mixed with $C_nH_m$;
identifying a targeted volume compression ratio for said fuel mixture from said database from a plurality of targeted volume compression ratios for said fuel mixture, wherein said targeted volume compression ratio for said fuel mixture is between about 5:1 to about 20:1, and said plurality of targeted volume compression ratios including at least a first targeted volume compression ratio to optimize energy output, a second targeted volume compression ratio to optimize fuel consumption, and a third targeted volume compression ratio to optimize emissions output;
determining a time period for opening and closing at least one of an intake valve and exhaust valve sufficient to provide an effective compression ratio for said fuel mixture in said selected cylinder based upon the targeted volume compression ratio for said fuel mixture;
opening and closing at least one of said intake valve and exhaust valve at said time period to provide said effective compression ratio;
wherein said effective compression ratio is within +/−10% of said targeted volume compression ratio for said fuel;
wherein said selected engine cylinder is a cylinder of an internal combustion engine which operates with variable valve timing; and
wherein said effective compression ratio is achieved without use of an external air-injection compressor.

10. The method of claim 9 including determining a time period for opening and closing both of said intake valve and exhaust valve sufficient to provide said effective compression ratio for said fuel mixture in said selected cylinder based upon the targeted volume compression ratio for said fuel mixture; and
opening and closing both of said intake valve or exhaust valve at said time period to provide said effective compression ratio.

11. The method of claim 9 including sensing a change in a composition of said fuel mixture and adjusting said time period for opening and closing at least one of said intake valve and exhaust valve to adjust said effective compression ratio for said change in said composition of said fuel mixture.

12. The method of claim 9 including evaluating a composition of said fuel mixture at a predetermined time interval to sense a change in said composition of said fuel mixture.

13. A system for adjusting the effective compression ratio for different fuels or blends of fuels for a selected cylinder comprising:
a database including at least one physical or optical property for each of a plurality of fuels having different compositions, and targeted volume compression ratios for the plurality of fuels including a time period for opening and closing at least one of an intake valve and exhaust valve to provide an effective compression ratio for a fuel in a selected cylinder based upon a targeted volume compression ratio for said fuel identified from a plurality of targeted volume compression ratios for said fuel, said plurality of targeted volume compression ratios including at least a first targeted volume compression ratio to optimize energy output, a second targeted volume compression ratio to optimize fuel consumption, and a third targeted volume compression ratio to optimize emissions output;
a fuel composition sensor configured to sense a presence of an oxygenated fuel having the formula $C_nH_mO_i$ and a hydrocarbon fuel having the formula $C_nH_m$ wherein the fuel composition sensor senses the presence of the fuel by sensing the presence of the at least one physical or optical property of the fuel;
an engine control unit which, upon receiving information from said sensor, is configured to adjust the time period for opening and closing at least one of said intake valve and exhaust valve to adjust said effective compression ratio;
wherein said effective compression ratio is within +/−10% of said targeted volume compression ratio for said fuel;
wherein said selected cylinder is a cylinder of an internal combustion engine which operates with variable valve timing; and
wherein said effective compression ratio is achieved without use of an external air-injection compressor.

14. The system of claim 13 including a fuel level sensor which is capable of sensing a change in fuel level in a tank, and wherein said engine control unit, upon receiving information from said fuel level sensor, evaluates information from said fuel composition sensor and adjusts said time period for opening and closing at least one of said intake valve and exhaust valve to adjust said effective compression ratio.

15. The system of claim 13, wherein said engine control unit is configured, at a predetermined time interval, to evaluate information from said fuel composition sensor.

16. The system of claim 13 wherein said engine control unit is configured to adjust said time period for opening and closing at least one of said intake valve and exhaust valve to provide said effective compression ratio within +/−10% of said argeted volume compression ratio for said fuel.

17. An article comprising a storage medium having stored thereon instruction that when executed by a machine result in the following operations:
- identifying a fuel from a plurality of fuels in a database with a fuel composition sensor which senses a presence of the fuel by sensing the presence of the at least one physical or optical property of the fuel;
- identifying a targeted volume compression ratio for said fuel from the database, said targeted volume compression ratio identified from a plurality of targeted volume compression ratios for said fuel, said plurality of targeted volume compression ratios including at least a first targeted volume compression ratio to optimize energy output, a second targeted volume compression ratio to optimize fuel consumption, and a third targeted volume compression ratio to optimize emissions output;
- determining a time period for opening and closing at least one of an intake value and exhaust valve sufficient to provide an effective compression ratio for said fuel in a selected cylinder based upon said targeted volume compression ratio for said fuel;
- opening and closing at least one of said intake valve and exhaust valve at said time period to provide said effective compression ratio; and
- wherein said effective compression ratio is within +/−10% of said targeted volume compression ratio for said fuel;
- wherein said selected cylinder is a cylinder of an internal combustion engine which operates with variable valve timing; and
- wherein said effective compression ratio is achieved without use of an external air-injection compressor.

* * * * *